US012224540B2

(12) United States Patent
Tokiwa

(10) Patent No.: US 12,224,540 B2
(45) Date of Patent: Feb. 11, 2025

(54) CONNECTION TERMINAL

(71) Applicant: Nippon Sheet Glass Company, Limited, Tokyo (JP)

(72) Inventor: Junichi Tokiwa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 336 days.

(21) Appl. No.: 17/621,876

(22) PCT Filed: Jun. 30, 2020

(86) PCT No.: PCT/JP2020/025600
§ 371 (c)(1),
(2) Date: Feb. 7, 2022

(87) PCT Pub. No.: WO2021/002340
PCT Pub. Date: Jan. 7, 2021

(65) Prior Publication Data
US 2022/0247093 A1 Aug. 4, 2022

(30) Foreign Application Priority Data
Jul. 1, 2019 (JP) ................................ 2019-123290

(51) Int. Cl.
*H01R 4/02* (2006.01)
*H01R 11/11* (2006.01)
*H05B 3/84* (2006.01)

(52) U.S. Cl.
CPC ............ *H01R 4/029* (2013.01); *H01R 11/11* (2013.01); *H05B 3/84* (2013.01); *H05B 2203/016* (2013.01)

(58) Field of Classification Search
CPC .......... H01R 4/029; H01R 11/11; H05B 3/84; H05B 2203/016
(Continued)

(56) References Cited

U.S. PATENT DOCUMENTS

2013/0333929 A1 12/2013 Ogawa et al.
2014/0110166 A1 4/2014 Degen et al.
(Continued)

FOREIGN PATENT DOCUMENTS

EP 3 193 406 A1 7/2017
EP 3 324 486 A1 5/2018
(Continued)

OTHER PUBLICATIONS

International Search Report (PCT/ISA/210) issued in PCT/JP2020/025600, dated Sep. 8, 2020.
(Continued)

*Primary Examiner* — Peter G Leigh
(74) *Attorney, Agent, or Firm* — Birch, Stewart, Kolasch & Birch, LLP

(57) ABSTRACT

The present invention provides a connection terminal to be fixed to a conductive portion provided on a glass plate for a vehicle. The connection terminal includes an installation portion having a fixing surface to be fixed to the conductive portion, a rising portion that extends from the installation portion in a direction away from the glass plate, a connection portion that is connected to the rising portion and has a power supply portion configured to supply power, and a solder attached to the fixing surface, in which the solder includes a protruding portion that protrudes from the fixing surface of the installation portion.

10 Claims, 8 Drawing Sheets

(58) Field of Classification Search
USPC .......................................................... 439/874
See application file for complete search history.

(56) References Cited

U.S. PATENT DOCUMENTS

| | | | |
|---|---|---|---|
| 2014/0182932 A1 | 7/2014 | Cholewa et al. | |
| 2015/0296569 A1 | 10/2015 | Rateiczak et al. | |
| 2017/0208687 A1 | 7/2017 | Morimoto et al. | |
| 2017/0312859 A1 | 11/2017 | Tokiwa et al. | |
| 2018/0200997 A1 * | 7/2018 | Tokiwa | H05B 3/84 |

FOREIGN PATENT DOCUMENTS

| | | | | |
|---|---|---|---|---|
| EP | 3 327 866 A1 | 5/2018 | | |
| JP | 56-78169 U | 6/1981 | | |
| JP | 2001-71173 A | 3/2001 | | |
| JP | 2014-519149 A | 8/2014 | | |
| JP | 2014-520355 A | 8/2014 | | |
| JP | 2016-503568 A | 2/2016 | | |
| JP | 2016-81589 A | 5/2016 | | |
| JP | 2017-22047 A | 1/2017 | | |
| JP | 2017-27799 A | 2/2017 | | |
| WO | WO-2012096373 A1 * | 7/2012 | | B23K 35/262 |
| WO | WO-2012118202 A1 * | 9/2012 | | B23K 35/262 |
| WO | WO-2012118203 A1 * | 9/2012 | | B23K 1/0008 |
| WO | WO-2016204247 A1 * | 12/2016 | | B60S 1/02 |
| WO | WO-2017014248 A1 * | 1/2017 | | B60S 1/02 |

OTHER PUBLICATIONS

Written Opinion of the International Searching Authority (PCT/ISA/237) issued in PCT/JP2020/025600, dated Sep. 8, 2020.
Japanese Notice of Reasons for Refusal for Japanese Application No. 2019-123290, dated Nov. 29, 2022, with English translation.
Japanese Office Action for Japanese Application No. 2019-123290, dated Jul. 11, 2023, with an English translation.
Extended European Search Report for European Application No. 20834773.2, dated Jun. 19, 2023.

* cited by examiner

CONNECTION TERMINAL

TECHNICAL FIELD

The present invention relates to a connection terminal to be fixed to a conductive portion provided on a glass plate for a vehicle, a connection terminal unit, and a method for fixing a connection terminal.

BACKGROUND ART

Patent Literature 1 discloses a connection terminal to be connected to a conductive layer of a glass plate of an automobile, for example. A cable or the like is connected to such a connection terminal, and power is supplied to the conductive layer via the connection terminal.

CITATION LIST

Patent Literature

Patent Literature 1: JP 2014-519149A

SUMMARY OF INVENTION

Technical Problem

Incidentally, such a connection terminal described above is fixed to the conductive layer via solder. However, if the connection terminal catches on something or a cable connected to the connection terminal is unintentionally pulled, there is a risk that a crack may form in the solder, the conductive layer, or the glass plate.

The present invention was made to resolve this issue, and an object thereof is to provide a connection terminal and a method for fixing the same with which it is possible to prevent a crack from forming in a conductive layer and a glass plate even if an external force is applied thereto.

Solution to Problem

A connection terminal according to the present invention is a connection terminal to be fixed to a conductive portion provided on a glass plate for a vehicle, the connection terminal including an installation portion having a fixing surface to be fixed to the conductive portion; a rising portion that extends from the installation portion in a direction away from the glass plate; a connection portion that is connected to the rising portion and includes a power supply portion configured to supply power; and a solder attached to the fixing surface, in which the solder includes a protruding portion that protrudes from the fixing portion of the installation portion.

A configuration may be adopted in which, in the connection terminal, the rising portion extends from an end portion of the installation portion, and the protruding portion of the solder protrudes from the end portion of the installation portion that is provided with the rising portion.

A configuration may be adopted in which, in the connection terminal, the connection portion extends substantially parallel to the installation portion.

A configuration may be adopted in which, in the connection terminal, the protruding portion of the solder protrudes from the fixing surface of the installation portion by 0.1 to 3.0 mm.

A configuration may be adopted in which, in the connection terminal, the connection portion extends in a direction away from the installation portion.

A configuration may be adopted in which, in the connection terminal, the protruding portion of the solder protrudes in a direction in which the connection portion extends.

In the connection terminal, the solder may have a Young's modulus of 10 to 50 GPa.

In the connection terminal, the solder may be a lead-free solder.

A connection terminal unit according to the present invention includes any one of the above-described connection terminals and a conductive cable that is connected to the power supply portion.

A configuration may be adopted in which, in the connection terminal unit, the conductive cable is connected to the power supply portion so as to extend in a direction opposite to the installation portion.

A method for fixing a connection terminal according to the present invention includes a step of preparing any one of the above-described connection terminals; and a step of fixing the installation portion to the conductive portion by melting the solder, in which the protruding portion of the solder after the installation portion is fixed to the conductive portion is formed in a shape protruding outward in a side view between the conductive portion and the rising portion.

Advantageous Effects of Invention

A connection terminal according to the present invention makes it possible to prevent a crack from forming in a conductive layer and a glass plate even if an external force is applied thereto.

DESCRIPTION OF EMBODIMENTS

Figure 1:
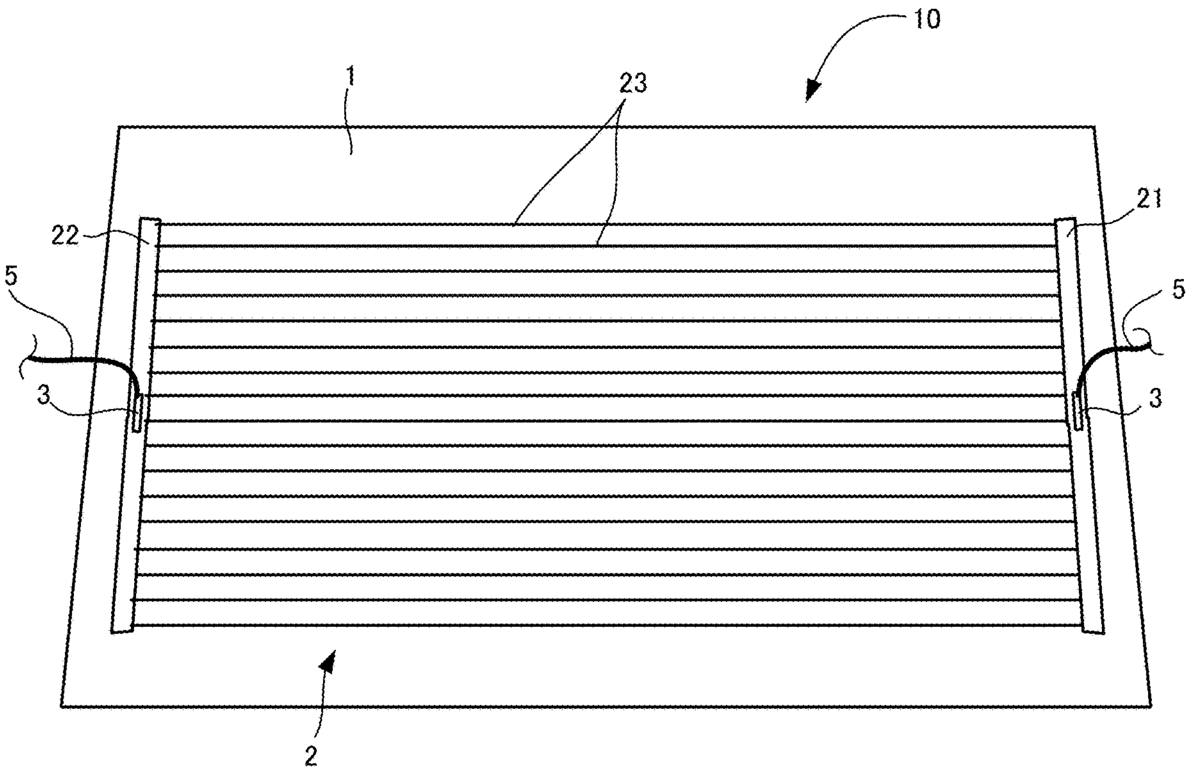
FIG. 1 is a plan view showing a glass plate module according to an embodiment of the present invention.

Hereinafter, an embodiment showing a mode in which a connection terminal according to the present invention is fixed to a glass plate of a vehicle will be described with reference to the drawings. FIG. 1 is a plan view of a glass plate module to which a connection terminal is fixed. As shown in FIG. 1, this glass plate module 10 is fit into a window frame of an automobile. Specifically, this glass plate module 10 includes a glass plate 1, a defogger 2 (a conductive layer) laminated on the glass plate 1, and a pair of connection terminals 3 attached to the defogger 2 using lead-free solders 4. A power supply cable 5 that extends from inside the vehicle is attached to each connection terminal 3, and a current supplied from the cable 5 is supplied to the defogger via the connection terminals 3. Hereinafter, each member will be described.

1. Glass Plate

A well-known glass plate for automobiles can be utilized as the glass plate 1. Heat absorbing glass, ordinary clear glass, ordinary green glass, dark privacy glass, or UV green glass may be utilized as the glass plate 1, for example. Such a glass plate 1 needs, however, to realize a visible light transmittance that meets safety standards of the country in which the automobile is to be used. For example, solar absorptivity, visible light transmittance, and the like can be adjusted to meet safety standards. Hereinafter, an example of the composition of clear glass and an example of the composition of heat absorbing glass will be shown.

Clear Glass $SiO_2$: 70 to 73 mass %
$Al_2O_3$: 0.6 to 2.4 mass %
CaO: 7 to 12 mass %
MgO: 1.0 to 4.5 mass %
$R^2O$: 13 to 15 mass % (R represents an alkaline metal)
Total iron oxide in terms of $Fe_2O_3$ ($T\text{-}Fe_2O_3$): 0.08 to 0.14 mass %

Heat Absorbing Glass

The composition of heat absorbing glass can, for example, be given as a composition, based on the composition of clear glass, including total iron oxide in terms of $Fe_2O_3$ ($T\text{-}Fe_2O_3$) at a ratio of 0.4 to 1.3 mass %, $CeO_2$ at a ratio of 0 to 2 mass %, and $TiO_2$ at a ratio of 0 to 0.5 mass %, and in which the skeletal component (mainly $SiO_2$ or $Al_2O_3$) of the glass is reduced by an amount equivalent to the increase in $T\text{-}Fe_2O_3$, $CeO_2$ and $TiO_2$.

Note that the type of glass plate 1 is not limited to clear glass or heat absorbing glass, and can be selected as appropriate according to the embodiment. For example, the glass plate 1 may be a resin window made of acrylic resin, polycarbonate resin or the like.

Also, the thickness of the glass plate 1 according to this embodiment need not be particularly limited. However, from the viewpoint of weight reduction, the thickness of the glass plate 1 may be set to a range of 2.2 to 5.1 mm, a range of 2.4 to 3.8 mm, or a range of 2.7 to 3.2 mm. Furthermore, the thickness of the glass plate 1 may be set to 3.1 mm or less.

Also, such a glass plate 1 may be a laminated glass in which an interlayer such as a resin film is sandwiched between multiple glass plates, in addition to a single glass plate.

2. Defogger

Next, the defogger 2 will be described. As shown in FIG. 1, the defogger 2 includes a pair of a first bus bar 21 and a second bus bar 22 for power supply that extend in the up-down direction along the two side edges of the glass plate 1. A plurality of horizontal elements 23 are disposed in parallel to each other at predetermined intervals between the two bus bars 21 and 22.

Also, a current is supplied from the connection terminal 3 attached to the first bus bar 21, and the connection terminal attached to the second bus bar 22 is grounded via the cable 5. With this configuration, when a current is supplied to the defogger 2, antifog heat is generated in the horizontal elements 23. Note that the bus bars 21 and 22 and the horizontal elements 23 are formed by printing and firing conductive silver paste onto a surface of the glass plate 1, for example. However, the material that constitutes the defogger 2 is not limited to this silver paste, and can be selected as appropriate.

3. Connection Terminal

Figure 2:
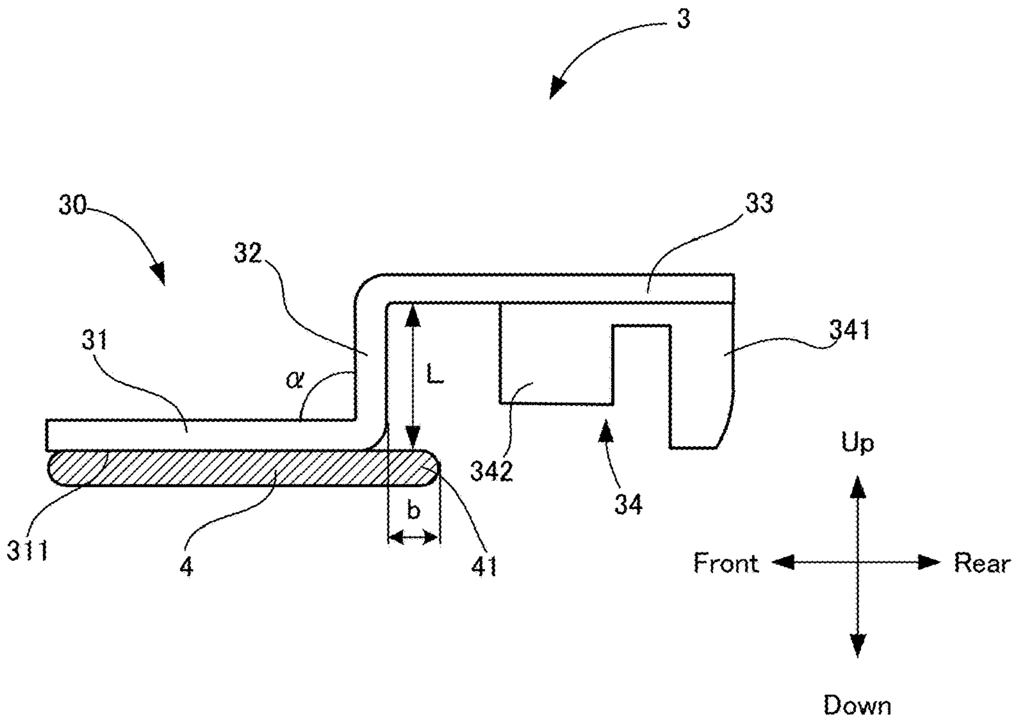
FIG. 2 is a side view of a connection terminal used in a glass plate module shown in FIG. 1.
Figure 3:
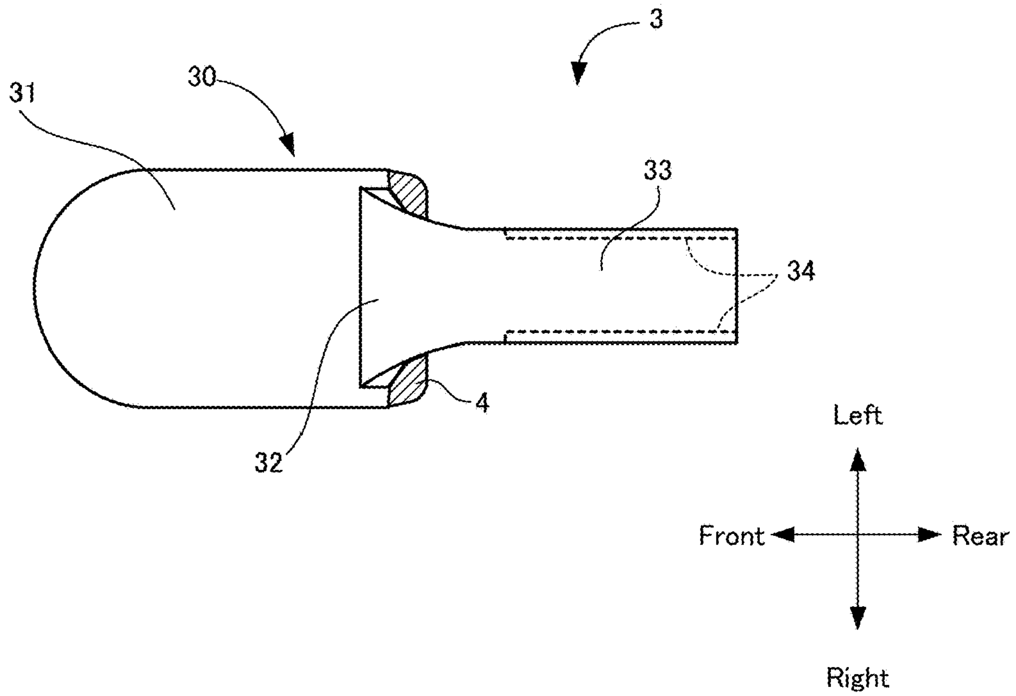
FIG. 3 is a plan view of FIG. 2.

Next, the connection terminal will be described with reference to FIGS. 2 and 3. FIG. 2 is a side view of the connection terminal, and FIG. 3 is a plan view of the connection terminal. For convenience of description, the connection terminal will be described with reference to the directions shown in FIG. 2. Specifically, in the following description, the up-down direction in FIG. 2 may be referred to as the up-down direction, the left-right direction in FIG. 2 may be referred to as the front-rear direction, and the up-down direction in FIG. 3 may be referred to as the left-right direction or the width direction.

As shown in FIGS. 2 and 3, the connection terminal 3 according to this embodiment includes a terminal main body 30, which is formed as a single body by bending a conductive material such as a plate-shaped metal, for example, and lead-free solder 4 attached to the terminal main body 30. The terminal main body 30 includes one plate-shaped installation portion 31 to be installed on the bus bar 21 or 22 of the defogger 2. The installation portion 31 is formed in a rectangular shape overall, and a front end side thereof is formed in an arc shape. Also, the lower surface (fixing surface) 311 of the installation portion 31 is fixed to the bus bar 21 or 22 via the lead-free solder 4. The length in the front-rear direction of the installation portion 31 may be 3 to 15 mm, and more preferably 4 to 12 mm, for example.

A plate-shaped rising portion 32, which extends upward, is integrally linked to the rear end portion of the installation portion 31. The rising portion 32 is formed in a rectangular shape, and rises at an angle of about 90 degrees with respect to the installation portion 31. Note that an angle $\alpha$ of the rising portion 32 with respect to the installation portion 31 is not particularly limited, and is preferably 80 to 150 degrees, and more preferably 80 to 120 degrees. As will be described later, by setting the angle $\alpha$ to 80 degrees or more in this manner, it is possible to prevent movement of the lead-free solder 4 from the installation portion 31 toward a connection portion 33 against gravity. On the other hand, as will be described later, by setting the angle $\alpha$ to 150 degrees or less, workability when heating the lead-free solder 4 can be ensured.

Also, the plate-shaped connection portion 33, which extends rearward horizontally, is integrally linked to an upper end portion of the rising portion 32. The connection portion 33 is formed in a rectangular shape in a plan view, and a pair of holding portions (power supply portions) 34 that extend downward are respectively linked integrally to the left and right sides thereof. Here, distance L from the lower surface of the installation portion 31 to the lower surface of the connection portion 33 in the perpendicular direction of the glass plate 1 is preferably 2 mm or more, more preferably 2.5 mm or more, and particularly preferably 3 mm or more. As will be described later, this is because, by setting the distance L to 2 mm or more, it is possible to prevent movement of the lead-free solder 4 from the installation portion 31 toward the connection portion 33 against gravity. Also, the length in the front-rear direction of the connection portion 33 may be 5 to 30 mm, and may be more preferably 8 to 25 mm, for example. This is because, if the connection portion 33 is excessively long, the installation space for the connection terminal 30 cannot be sufficiently secured. On the other hand, this is because, if the connection portion 33 is excessively short, as will be described later, the connection portion 33 is less likely to absorb a force applied thereto, and an excessive force may be applied to the solder 4 and the solder 4 may be peeled away from the defogger 2.

Furthermore, each holding portion 34 includes a first holding piece 341 disposed on the rear end side of the connection portion 33 and a second holding piece 342 that extends downward over a length shorter than that of the first holding piece 341 and disposed on the front end side of the connection portion 33. The two holding portions 34 are disposed on the rear end side relative to the installation portion 31 on the connection portion 33 in this manner. Also, as will be described later, the cable 5 is disposed between the two holding portions 34, and the cable 5 is fixed to the holding portions 34 by crimping the two holding portions 34.

As described above, the connection terminal 30 is formed by one plate member, and the thickness of the plate member may be 0.1 to 2.0 mm, for example, and may preferably be 0.4 to 1.0 mm. The reason for this being that an excessively thin plate member is not preferable because, when the cable 5 is lifted upward, the connection portion 33 is likely to bend with respect to the rising portion 32. On the other hand, this is because, if the plate member is excessively thick, as described above, the connection portion 33 is less likely to absorb a force applied thereto, and an excessive force may be applied to the solder 4 and the solder 4 may be peeled away from the defogger 2.

4. Solder

Next, the lead-free solder 4, which is to be applied to the installation portion 31 of the terminal main body 30, will be described. As shown in FIGS. 2 and 3, the lead-free solder 4 is formed in a substantially plate shape, and is attached to the entire lower surface 311 of the installation surface 31. Furthermore, this lead-free solder 4 has a protruding portion 41 that protrudes rearward from a rear end of the installation portion 31. The protruding portion 41 protrudes from the rear end of the installation portion 31, that is, a portion where the installation portion 31 is linked to the rising portion 32, in a direction in which the connection portion 33 extends, and the protruding length b thereof is preferably 0.1 to 3.0 mm, and more preferably 0.3 to 2.5 mm, for example. This is because solidified lead-free solder can be formed in a fan shape in a side view by setting the protruding length b to 0.1 mm or more. On the other hand, if the protruding length b is larger than 3.0 mm, lead-free solder may protrude to a height where it comes into contact with the connection portion 33. This is because, with such a shape, particularly when a force that bends the connection portion 33 upward is applied, the connection portion 33 and the rising portion 32 are likely to come loose from the solder. Furthermore, the lead-free solder 4 may have a thickness of 0.3 to 1.5 mm, for example. Note that, as will be described later, when fixing the connection terminal 3, the lower surface of the protruding portion 41 of the lead-free solder 4 comes into contact with the bus bar 21 or 22, whereas an upper surface 411 thereof constitutes a surface that does not come into contact with the connection terminal 3 and does not come into contact with the bus bar 21 or 22.

Such lead-free solder 4 is formed in a plate shape in advance, and the lead-free solder 4 can be fixed to the installation portion 31 by melting a portion thereof. Furthermore, the material that constitutes the lead-free solder 4 is not particularly limited, and it is possible to use lead-free solder such as indium-based, bismuth-based, tin-based, tin-silver-based, or tin-zinc-based lead-free solder, for example. In particular, indium-based lead-free solder is a soft material, and thus it is possible to suppress damage to a glass plate caused by residual stress. Furthermore, in order to alleviate stress concentration, it is preferable to use a soft lead-free solder such as an indium-based solder having a melting point of 150° C. or lower.

5. Attachment of Connection Terminal

Figure 4:
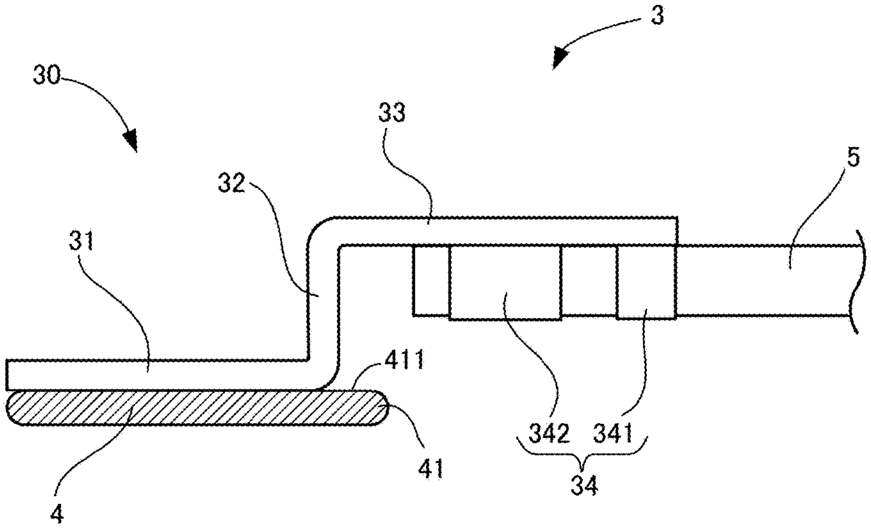
FIG. 4 is a side view showing a method for attaching the connection terminal shown in FIG. 2 to the glass plate.
Figure 6:
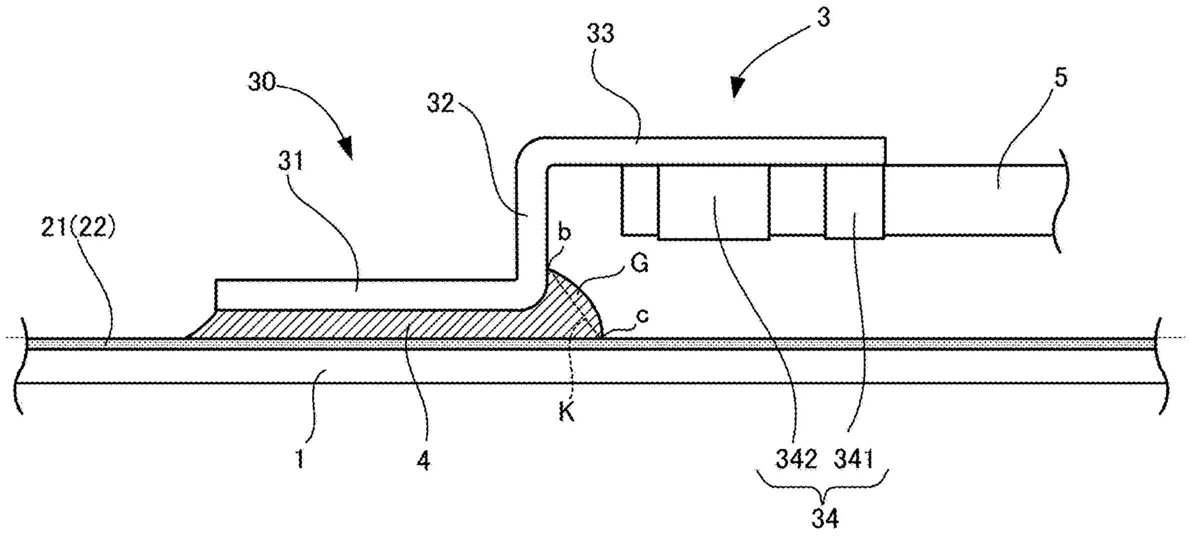
FIG. 6 is a side view showing the method for attaching the connection terminal shown in FIG. 2 to the glass plate.

Next, a method for attaching the connection terminal will be described with reference to FIGS. 4 and 6. First, as shown in FIG. 4, the cable 5 is disposed between the two holding portions 34, and the cable 5 is fixed to the lower surface side of the connection portion 33 by crimping the two holding portions 34. Note that the cable 5 is coated with a non-conductive member such as rubber, except for the connection portion where the connection terminal 3 is connected to the two holding portions 34.

Figure 5:
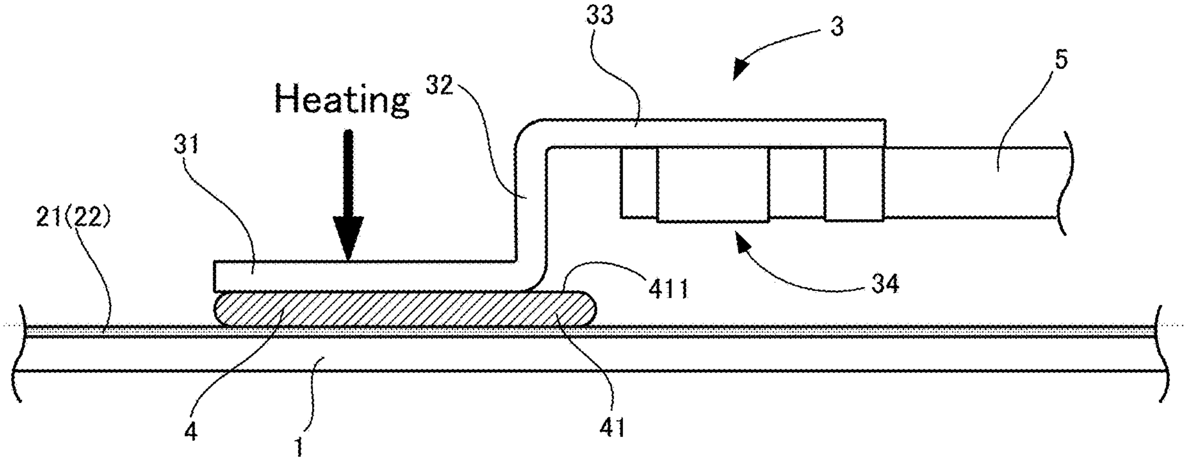
FIG. 5 is a side view showing the method for attaching the connection terminal shown in FIG. 2 to the glass plate.

Subsequently, the connection terminal 3 prepared as described above is fixed to the bus bar 21 or 22. First, as shown in FIG. 5, the connection terminal 3 is disposed on the bus bar 21 or 22. That is, the connection terminal 3 is disposed such that the lead-free solder 4 is in contact with the bus bar 21 or 22. At this time, the upper surface 411 of the protruding portion 41 of the lead-free solder 4 is not in contact with any one of the connection terminal 3, the bus bar 21, or the bus bar 22. Then, the upper surface side of the installation portion 31 of the terminal main body 30 is heated. Accordingly, heat is transmitted to the lead-free solder 4 via the installation portion 31, and the lead-free solder 4 is melted. As a result, as shown in FIG. 6, the lead-free solder 4 spreads between the installation portion 31 and the bus bar 21 or 22, and spreads in the plane direction of the glass plate 1. In this process, the protruding portion 41 of the lead-free solder 4 that protrudes from the installation portion 31 is shaped so as to protrude in an arc shape to finally form a fan shape between the rising portion 32 and the glass plate 1 in a side view while also spreading upward along the rising portion 32. That is, the lead-free solder 4 protrudes outward of a line K that connects an upper end b of the lead-free solder 4 that is in contact with the rising portion 32 and a rear end c of the lead-free solder 4 that is in contact with the bus bar 21 or 22 in a side view. Note that the protruding shape of the lead-free solder 4 is not particularly limited, and is preferably a shape that protrudes outward of the line Kin the side view. Then, the installation portion 31 is fixed to the bus bar 21 or 22 along with the solidification of the lead-free solder 4.

6. Features

As described above, with the glass plate module according to this embodiment, the following effects can be achieved.

(1) With the connection terminal 3 according to this embodiment, because the lead-free solder 4 attached to the installation portion 31 is provided with the protruding portion 41 that protrudes from the installation portion 31 in advance, if the lead-free solder 4 is melted, the protruding portion 41 thereof spreads along the glass plate 1 (the bus bar 21 or 22). Therefore, it is possible to improve adhesive strength by using the lead-free solder 4. In particular, the protruding portion 41 protrudes from the end portion provided with the rising portion 32 of the installation portion 31, and thus, the melted lead-free solder 4 also spreads upward along the rising portion 32. Accordingly, the lead-free solder 4 can fix the connection terminal 3 including the rising portion 32 to the bus bar 21 or 22, and it is possible to improve adhesive strength. Furthermore, the protruding portion 41 of the lead-free solder 4 spreads upward along the rising portion 32, thus forming a shape that protrudes in an arc shape (a shape that protrudes outward of the above-described line K) so as to forma fan shape between the rising portion 32 and the glass plate 1 in a side view. Therefore, the amount of the lead-free solder covering the vicinity of the portion where the installation portion 31 is linked to the rising portion 32 is increased, and thus it is possible to further improve the adhesive strength between the vicinity of the linked portion G and the bus bar 21 or 22.

Figure 7:
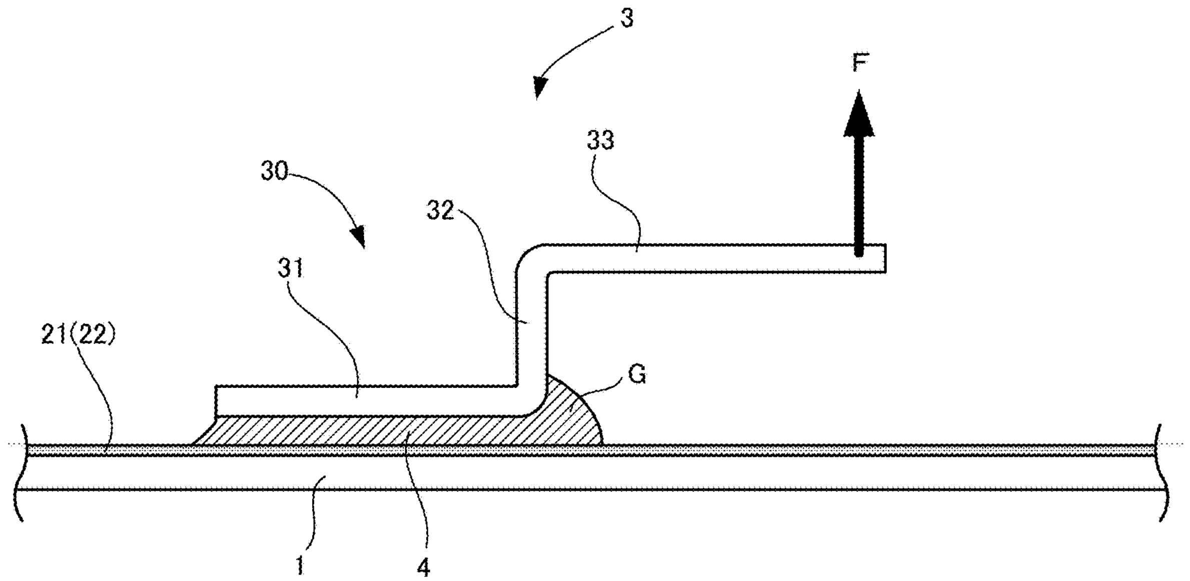
FIG. 7 is a diagram illustrating a mechanism when a load is applied to the connection terminal relating to FIG. 6.

Here, as shown in FIG. 7, if an upward force F is applied to the rear end portion of the connection portion 33, stress is concentrated in the vicinity of the above-described linked portion G of the connection terminal 3 due to rotation moment of the force F. However, in this embodiment, the adhesive strength of the vicinity of the linked portion G is improved as described above, and thus it is possible to prevent the formation of a crack in the bus bar 21 and 22 and the glass plate 1.

As described above, if an external force is applied to the connection portion 33 of the connection terminal 3, for example, if an operator or a work tool comes into contact therewith, or even if the cable 5 is unintentionally pulled, it is possible to prevent the formation of a crack in the bus bar 21 and 22 and the glass plate 1, or it is possible to prevent the connection terminal 3 from coming loose from the bus bar 21 or 22 as described above. In particular, because the lead-free solder 4 is hard, a crack is likely to form compared to a lead-based solder, for example. However, even if the lead-free solder 4 is used, the connection terminal 3 according to this embodiment makes it possible to prevent the formation of a crack.

(2) Although the connection terminal 3 according to this embodiment is provided with the rising portion 32, the cable 5 is held by the holding portions 34 on the lower surface side of the connection portion 33, and thus it is possible to reduce the height of the connection terminal 3 that protrudes from the glass plate 1. Therefore, it is possible to keep the connection terminal 3 from coming into contact with an operator, a work tool, or the like. Also, because the holding portions 34 do not protrude from the upper surface of the connection portion 33, the connection terminal 3 may have a compact structure.

(3) Because the end portion of the installation portion is provided with the rising portion that rises upward, the melted lead-free solder 4 is less likely to move to the connection portion 33 against gravity, and the lead-free solder 4 can be pooled in the vicinity of the portion where the installation portion is linked to the rising portion, and thus it is possible to further reliably prevent the formation of a crack.

7. Variations

Although an embodiment of the present invention has been described above, the present invention is not limited to the above-described embodiment, and various changes can be made without departing from the gist of the invention. Furthermore, the following variations can be combined as appropriate.

(1)

Figure 8:
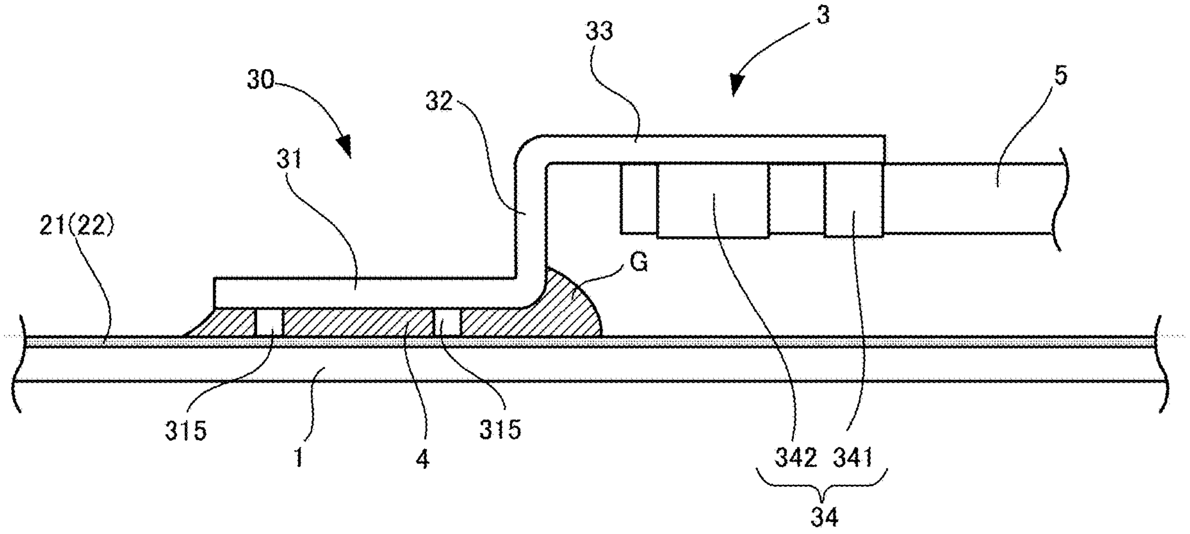
FIG. 8 is a side view showing another example of a connection terminal according to the present invention.

The shapes of the installation portion 31, the rising portion 32, and the connection portion 33 are not particularly limited, and may be various shapes. The connection portion 33 need not be parallel to the glass plate 1, and may intersect with the rising portion 32 at an angle other than a perpendicular angle, for example. Also, as shown in FIG. 8, for example, the area of contact with the lead-free solder 4 can be increased by forming a plurality of protruding portions 315 on the lower surface of an installation portion 31. Furthermore, the thickness of the lead-free solder 4 disposed between the installation portion 31 and the bus bar 21 or 22 can be made constant by providing such protruding portions 315 and causing these protruding portions 315 to come into contact with the bus bar 21 or 22. Accordingly, it is possible to prevent the amount of the lead-free solder 4 disposed between the installation portion 31 and the bus bar 21 or 22 from being excessively small or large, and it is possible to make adhesive strength uniform. Furthermore, the connection portion 33 need not extend in the front-rear direction, and the connection portion 33 may extend in the left-right direction (the width direction) and the cable 5 may be connected thereto in the left-right direction.

Figure 9:
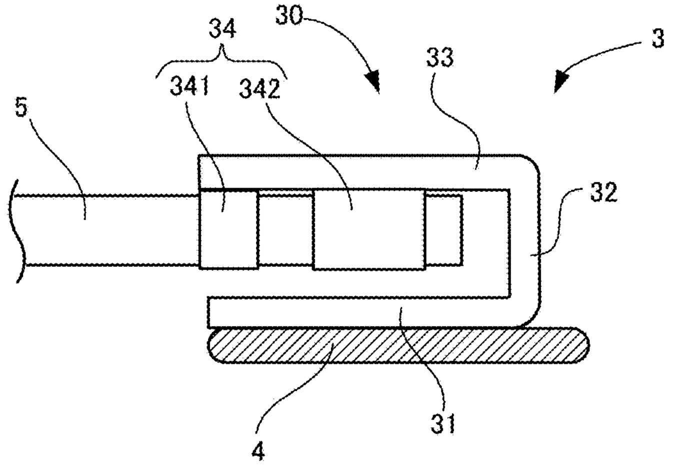
FIG. 9 is a side view showing another example of a connection terminal according to the present invention.

Furthermore, although the connection portion 33 extends in the direction opposite to the installation portion 31 in the above-described embodiment, as shown in FIG. 9, the connection portion 33 may extend from the upper end of the rising portion 32 in the same direction as the direction in which the installation portion 31 extends. That is, the installation portion 31, the rising portion 32, and the connection portion 33 may be linked in a U-shape in a side view.

Although the rising portion 32 extends upward from the end portion of the installation portion 31 in the above-described embodiment, the rising portion 32 may extend upward from a portion other than the end portion of the installation portion 31. Furthermore, it is also possible to provide two installation portions 31.

(2)

Although the connection portion 33 and the cable 5 are fixed by crimping the holding portions 34 in the above-described embodiment, the fixing method is not limited to this. That is, various methods by which a power supply portion of the present invention supplies power to the connection portion 33 can be used. The cable 5 and the connection portion 33 can be fixed to each other by attaching a connector to the leading end of the cable 5 and fitting the connector to the connection portion 33, or by using solder or a conductive adhesive, for example. Also, if there is no limit to the height of the connection terminal 3 that protrudes from the glass plate 1, the cable 5 can also be fixed to the upper surface side of the connection portion 33.

(3)

Although the lead-free solder 4 is used in the above-described embodiment, it is also possible to use a lead-based solder other than the lead-free solder. Also, if solder having a Young's modulus of 10 to 50 GPa is used regardless of the material, for example, resistance to stress is increased, and a crack is prevented from forming when an external force is applied. Note that the Young's modulus can be measured using a method according to the method for measuring static Young's modulus defined in JIS Z2280-1993 as a method for measuring Young's modulus, for example. At this time, measurement can be performed at room temperature using a strain gauge.

(4)

The protruding direction of the protruding portion 41 of the lead-free solder 4 is not particularly limited, and it is sufficient that the protruding portion 41 protrudes from any portion of the peripheral edge of the installation portion 31. The protruding portion 41 may protrude in the direction in which the connection portion 33 extends, which is shown in FIG. 9, for example. However, it is preferable that the protruding portion 41 extends from the end portion of the installation portion 31 that is provided with the rising portion 32 as in the above-described embodiment because it is possible to improve the adhesive strength by using the lead-free solder 4 described above.

(5)

Although an example in which the connection terminal 3 is fixed to the defogger 2 is described in the above-described embodiment, the connection terminal of the present invention is applicable to any electric components to which a current is supplied, other than defoggers. Examples thereof include antennas and various heaters of windshields.

(6)

It is also possible to apply flux onto a conductive layer and fix the terminal main body 30 thereto via the lead-free solder 4. This makes it possible to easily form the lead-free solder 4 into a shape that widens at the bottom portion thereof. In this case, a gammalux (manufactured by Senju Metal Industry Co., Ltd.) may be used as flux, for example.

EXAMPLES

Hereinafter, examples of the present invention will be described. The present invention is, however, not limited to the following examples.

1. Preparation of Example and Comparative Example

Figure 10:
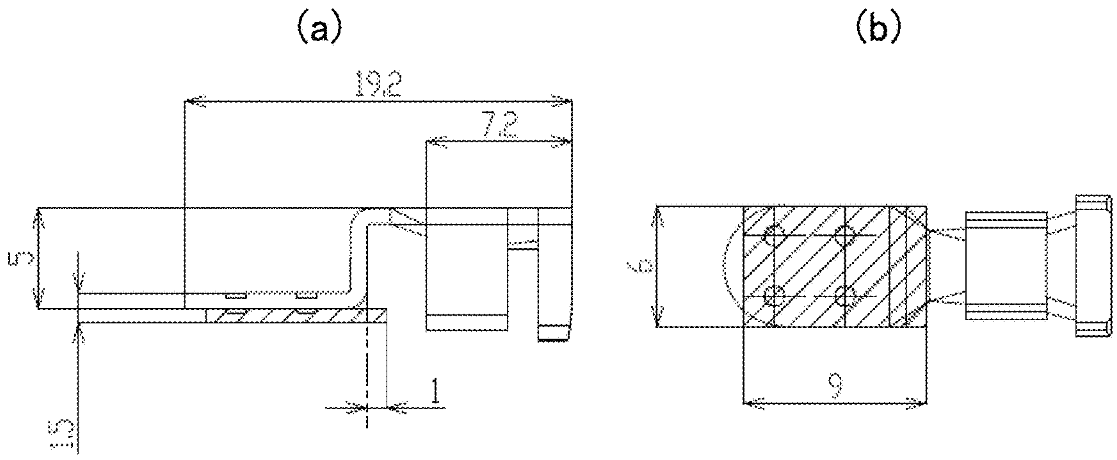
FIG. 10(*a*) is a side view and FIG. 10(*b*) is a bottom view of a connection terminal according to an example.
Figure 11:
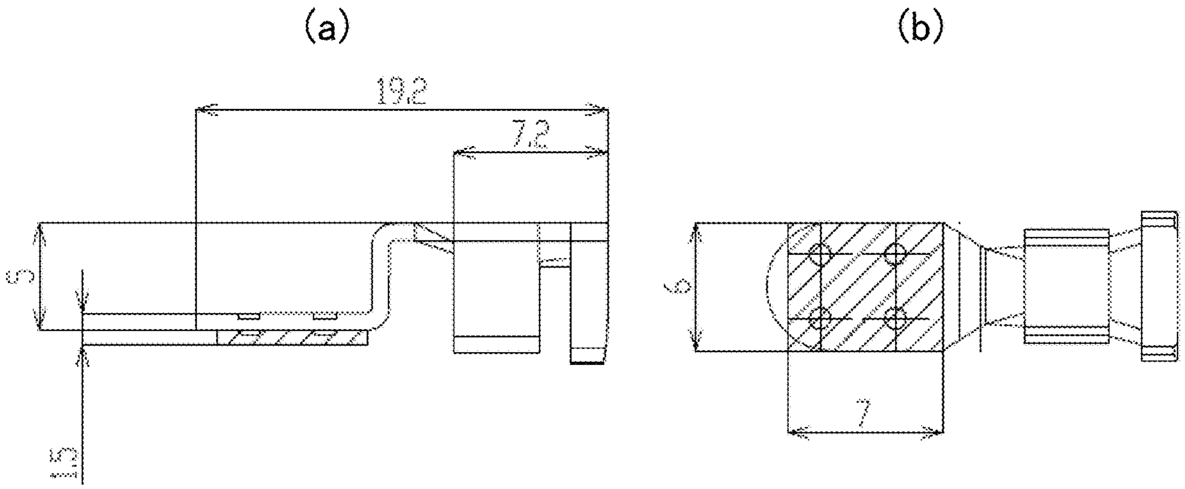
FIG. 11(*a*) is a side view and FIG. 11(*b*) is a bottom view of a connection terminal according to a comparative example.

A connection terminal having the same form as that of the above-described embodiment was produced as an example. Specifically, the connection terminal shown in FIG. 10 was produced. Copper was used as a material thereof, and the dimensions thereof are as shown in FIG. 10 (units are in mm). The lower surface of the installation portion is provided with four protruding portions having a protruding height of 0.5 mm. On the other hand, the connection terminal shown in FIG. 11 was produced as a comparative example. The main difference from the example is that the lead-free solder is not provided with a protruding portion that protrudes from the installation portion. Note that the thickness of the lead-free solder attached to the installation portion was 0.8 mm, and was larger than the height of the protruding portions in the example and the comparative example.

Figure 12:
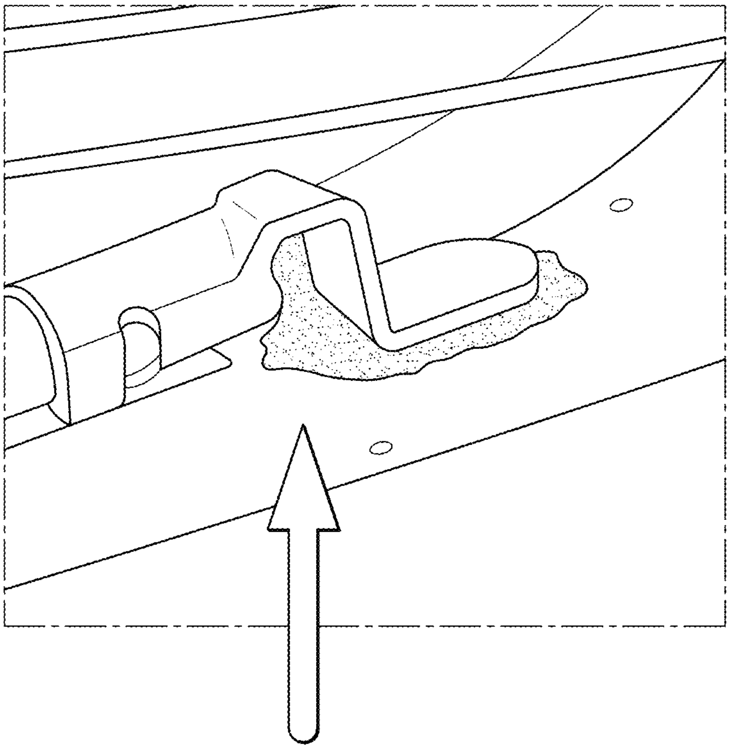
FIG. 12 is a photograph showing an example attached to a conductive layer.
Figure 13:
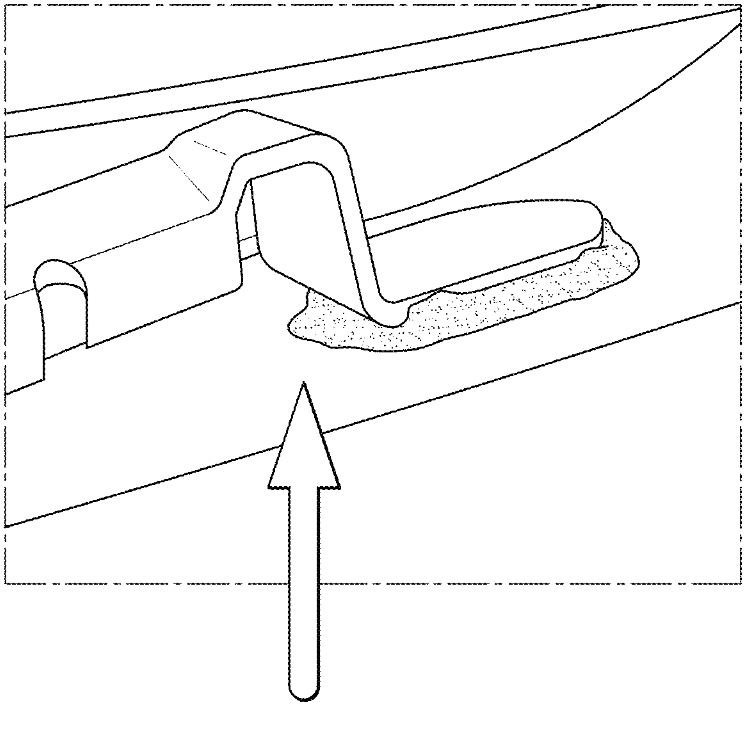
FIG. 13 is a photograph showing a comparative example attached to a conductive layer.

Then, the installation portions of the example and the comparative example that were configured as described above were each fixed to a conductive layer (whose material was Ag) laminated on a glass plate (an air-cooled tempered glass plate having a thickness of 3.1 mm) using a lead-free solder (Sn was 96.5% and Ag was 3.5%). At that time, the installation portion was fixed such that the protruding portions of the lower surface of the installation portion came into contact with the conductive layer. Therefore, lead-free solder was pressed between the installation portion and the conductive layer and was spread out in the plane direction. As a result, as shown in FIG. 12, the connection terminal according to the example was fixed to the conductive layer. That is, a portion of the lead-free solder that was disposed between the conductive layer and the rising portion protruded so as to have a fan shape in a side view. Note that the height of the lead-free solder from the lower surface of the installation portion to the uppermost portion (reference numeral A in FIG. 14) was 0.8 mm. On the other hand, as shown in FIG. 13, with the connection terminal according to the comparative example, although the lead-free solder was spread out, the lead-free solder substantially was mostly below the installation portion, and did not protrude from the portion where the installation portion is linked to the rising portion. The example and the comparative example that were formed in this manner were stored in a storage room at a temperature of 80° C. and a humidity of 95% for 500 hours.

2. Adhesive Strength Test

Figure 14:
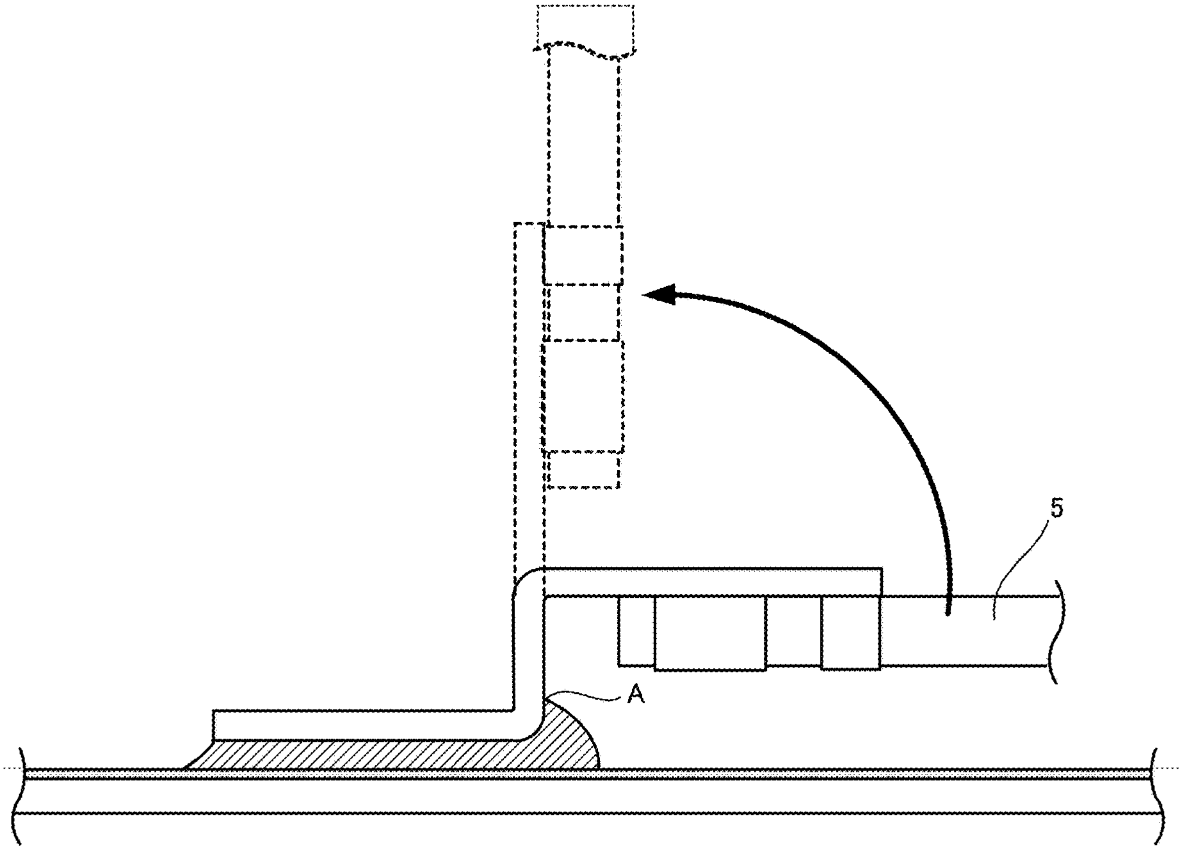
FIG. 14 is a diagram illustrating a method of performing an adhesive strength test.

Next, two examples and two comparative examples that were configured as described above were prepared, and adhesive strength tests were performed thereon. That is, as shown in FIG. 14, a cable 5 was pulled upward to rotate the connection portion to a position where it extended on one straight line with respect to the rising portion. A force that was applied to the cable 5 was measured in this process, and a force (units are in N) needed to form a crack in a conductive layer or a glass plate was measured. The results thereof are shown in Table 1 below.

TABLE 1

| | 1 | 2 |
|---|---|---|
| Example | 260.7 | 256.8 |
| Comparative Example | 175.4 | 165.6 |

Cracks formed in the vicinities of the portions where the installation portions and the rising portions were linked in the example and the comparative example during the tests. As shown in Table 1, when a force larger than that in the comparative examples was applied, cracks formed in all of the samples of the example. Therefore, it was found that adhesive strength of the examples to the conductive layer was improved, compared to the comparative examples.

As shown in FIGS. 12 and 13, it is conceivable that with regard to the examples, the adhesive strength of the vicinity of the portion where the installation portion and the rising portion were linked was improved because the amount of the lead-free solder covering this vicinity thereof was larger than that of the comparative examples. That is, it is conceivable that the formation of a crack is suppressed because the adhesive strength of a portion where stress is most likely to concentrate under a force acting on the cable as described above was improved.

LIST OF REFERENCE NUMERALS

1 Glass plate
2 Defogger (conductive layer)
3 Connection terminal
4 Lead-free solder
31 Installation portion
32 Rising portion
33 Connection portion
34 Holding portion (power supply portion)

The invention claimed is:

1. A connection terminal to be fixed to a conductive portion provided on a glass plate for a vehicle, the connection terminal comprising:

an installation portion having a fixing surface to be fixed to the conductive portion;

a rising portion that extends from the installation portion in a direction away from the glass plate;

a connection portion that is connected to the rising portion and includes a power supply portion configured to supply power; and a solder portion attached to the fixing surface and formed in a substantially plate shape, wherein the solder includes a protruding portion that protrudes in a direction in which the connection portion extends from the fixing surface of the installation portion and the protruding portion does not contact the rising portion.

2. The connection terminal according to claim 1, wherein the rising portion extends from an end portion of the installation portion, and the protruding portion of the solder portion protrudes from the end portion of the installation portion that is provided with the rising portion.

3. The connection terminal according to claim 1, wherein the connection portion extends substantially parallel to the installation portion.

4. The connection terminal according to claim 1, wherein the protruding portion of the solder portion protrudes from the fixing surface of the installation portion by 0.1 to 3.0 mm.

5. The connection terminal according to claim 1, wherein the connection portion extends in a direction away from the installation portion.

6. The connection terminal according to claim 1, wherein the solder of the solder portion has a Young's modulus of 10 to 50 GPa.

7. The connection terminal according to claim 1, wherein the solder of the solder portion is a lead-free solder.

8. A connection terminal unit comprising:

the connection terminal according to claim 1; and a conductive cable that is connected to the power supply portion.

9. The connection terminal unit according to claim 8, wherein the conductive cable is connected to the power supply portion so as to extend in a direction opposite to the installation portion.

10. A method for fixing a connection terminal, comprising:

preparing the connection terminal according to claim 1; and fixing the installation portion to the conductive portion by melting the solder, wherein the protruding portion of the solder after the installation portion is fixed to the conductive portion is formed in a shape protruding outward in a side view between the conductive portion and the rising portion.

* * * * *